L. DEWALD.
COTTON CHOPPER.
APPLICATION FILED OCT. 24, 1907.
920,929.
Patented May 11, 1909.
2 SHEETS—SHEET 1.
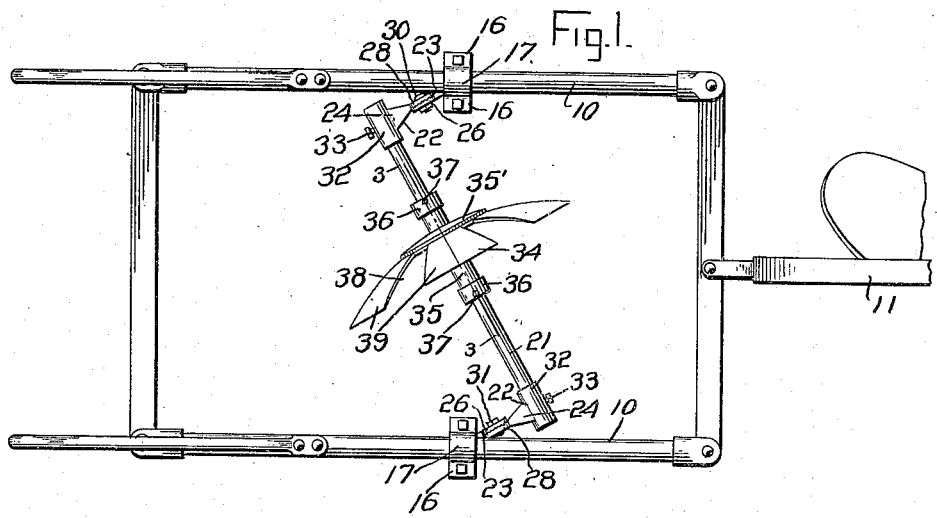
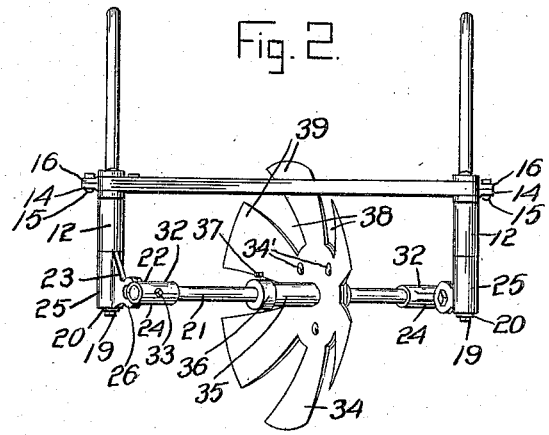
Witnesses
C. K. Reichenbach.
John Powers.
Inventor
L. Dewald.
By Chandler & Chandler
Attorneys.

L. DEWALD.
COTTON CHOPPER.
APPLICATION FILED OCT. 24, 1907.
No. 920,929.
Patented May 11, 1909.
2 SHEETS—SHEET 2.
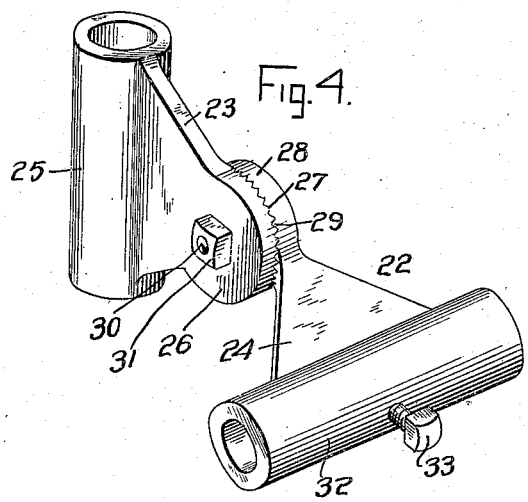
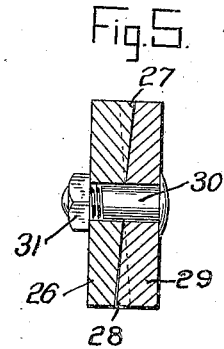
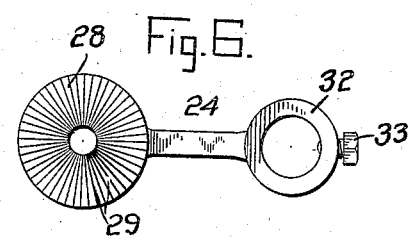
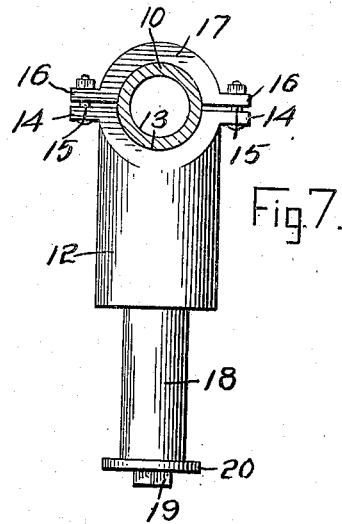
Witnesses
Inventor
L. Dewald
By Chandler & Chandler
Attorneys

UNITED STATES PATENT OFFICE.

LOUIS DEWALD, OF COPPERAS COVE, TEXAS.

COTTON-CHOPPER.

No. 920,929.  Specification of Letters Patent.  Patented May 11, 1909.

Application filed October 24, 1907. Serial No. 399,022.

*To all whom it may concern:*

Be it known that I, LOUIS DEWALD, a citizen of the United States, residing at Copperas Cove, in the county of Coryell, State of Texas, have invented certain new and useful Improvements in Cotton-Choppers; and I do hereby declare the following to be a full, clear, and exact description of the invention, such as will enable others skilled in the art to which it appertains to make and use the same.

This invention relates to new and useful improvements in cotton choppers and it has more particular reference to a cotton chopper of that type which includes an axle suspended from parallel beams, the latter having their ends pivotally connected to the frame of a cultivator.

The invention in its broad conception comprises an axle which is disposed diagonally with respect to its supporting beams and it is the primary object of the invention to provide novel means for shifting the diagonally disposed axle laterally with respect to the line of draft by pivotal movement of the supporting beams.

The invention aims as a further object to provide a cotton chopper in which the axle that supports the chopping wheel is adjustable vertically so as to vary the degree of distance between the said wheel and the ground.

The invention finally aims to provide a novel construction, combination and arrangement of parts, the details of which will appear in the course of the following description in which reference is had to the accompanying drawings, forming a part of this specification, like characters of reference designating similar parts, throughout the several views, wherein:—

Figure 1 is a top plan view showing the preferred embodiment of the cotton chopper comprehended in the present invention. Fig. 2 is an end elevation thereof showing the manner of mounting the diagonal axle above referred to. Fig. 3 is a section on the line 3—3 of Fig. 1, showing the manner of mounting the cotton chopping wheel upon the axle. Fig. 4 is a detailed perspective view of one of the brackets for supporting the axle, the other bracket being a counterpart in construction. Fig. 5 is an enlarged cross sectional view through the adjustable pivotal connection of the two sections forming each bracket. Fig. 6 is a detailed side elevation of one of the sections shown in Fig. 5. Fig. 7 is a detailed end elevation showing one of the hangers for the said brackets, the other hanger being a counterpart in construction, the beam upon which the said hanger is carried being shown in section.

In the accompanying drawings, the numeral 10 designates parallel supporting beams which are pivoted at their front ends to the rear end of the cultivator frame, the latter being designated by the numeral 11 and being illustrated fragmentarily. The beams 10 are preferably round in cross section and have mounted thereupon hangers 12, formed in their upper faces with curved recesses 13, which afford seats for the beams 10. Adjacent the recesses 13, oppositely disposed laterally projecting apertured horizontal ears 14 are formed, through which fastening bolts 15 are engaged, the bolts 15 likewise being engaged through similar ears 16 provided at the ends of a curved clamping plate 17, the plate 17 fitting over the beams 10. The hangers 12 have their lower ends reduced as at 18 and threaded into said lower end are bolts 19 which confine washers 20.

The supporting axle is designated by the numeral 21 and its ends are supported in similarly constructed brackets 22, one of which is illustrated more particularly in Figs. 4, 5 and 6. The brackets 22 each comprise pivotally connected sections 23 and 24, the section 23 being formed at one end with a vertical sleeve 25 surrounding the reduced end portion 18 of the hanger 12 and held from downward displacement by the washer 20. At its other end, the section 23 is formed with a substantially disk shaped part 26, which is disposed in a vertical plane and which has its inner face formed with radially extending teeth 27. The section 24 has one end formed with a substantially disk shaped part 28 having its inner face provided with radially extending teeth 29 which are adapted to fit between the teeth 27 and to hold the sections 23 and 24 in interlocked relation at selected pivotal adjustments. For the purpose of clamping the sections 23, and 24 together in their interlocked relation, a bolt 30 is employed, the latter passing through central openings in said sections and carrying on one end thereof, a clamping nut 31. The section 24 has its outer end formed with a horizontally disposed sleeve 32, through which one end of the axle 21 projects. Set screws 33 are threaded through the sleeves 32 and with their ends frictionally engage the ends of the axle 21, so as to hold the latter from axial displacement. By reference to Fig. 1, it will be observed that one of the brackets 22 projects forwardly and that the other bracket projects rearwardly. By virtue of this arrangement, the axle 21 is supported diagonally with relation to the beams 10.

The chopping wheel is designated by the numeral 34 and is of disk shape with a dished or concave face. Said wheel surrounds a hub 35 and is detachably secured thereto by fastening bolts or screws 34' engaged through a flange 35' on said hub. The axle 21 passes through the hub 35 and is provided with stop collars 36 held by set screws 37, the collars 36 bearing against the ends of the extensions 35 and serving to hold the wheel 34 against movement axially of the axle 21. The said wheel is provided with recesses 38 extending radially to the periphery thereof and affording a plurality of radially disposed chopping blades 39. The detachable connection afforded by the bolts 34' allows of the optional use of wheels of varying sizes or form in accordance with the character of the work to be performed and the circumstances and conditions of use.

In use, the axle 21 is set at selected positions with relation to the ground by adjusting the sections 24 pivotally with relation to the sections 23 in the manner described. It will be apparent that if so desired, one end of said axle may be positioned above or below the other end thereof. The reduced end portions 18 of the hangers 12 constitute pivots for the sleeves 25 to allow the sections 23 to have swinging movement in horizontal planes. When it is desired to change the position of the angularly disposed chopping wheel 34, the beams 10 are swung in the same direction to either side to shift the said wheel laterally with respect to the line of draft. Such swinging movement of the beams 10 serves, by virtue of the provision of the pivotally mounted sleeves 25, to shift the axle 21 laterally, whereby the position of the wheel 34 is correspondingly varied.

The invention is simple in its structural details, inexpensive to manufacture and practical and efficient in use.

What is claimed is:

1. A cotton chopper comprising a horizontally movable pivotal frame, brackets adjustable longitudinally on the frame, horizontal swinging sections supported by the sections, a chopping wheel, and means cooperative with the latter and in interlocking engagement with the sections to vertically adjust said wheel.

2. In a cotton chopper, shiftable supporting beams pivotally connected to each other, brackets suspended therefrom and longitudinally adjustable on the beams, vertically adjustable sections associated with the brackets, an axle having its ends mounted in said adjustable sections, and a chopping wheel mounted upon said axle.

3. In a cotton chopper, shiftable supporting beams pivotally connected to each other, brackets longitudinally adjustable on the beams, vertically adjustable sections associated with the brackets, an axle having its ends mounted in said adjustable sections, and a chopping wheel longitudinally adjustable upon said axle.

4. In a cotton chopper, a supporting frame including a plurality of pivotally connected side and end beams, brackets depending from the side beams and longitudinally adjustable thereon, sections pivotally connected to the brackets and adapted to move in a horizontal plane, vertically adjustable sections in interlocking engagement with the first mentioned sections, an axle carried by the last mentioned sections and disposed diagonally with respect to the sides of the frame, and a chopping wheel longitudinally adjustable on the axle.

5. In a cotton chopper, a frame having shiftable side and end beams pivotally connected to each other, a chopping wheel angularly disposed with respect to the side beams and vertically and horizontally adjustable thereon, and independent means for shifting the chopping wheels intermediate the side beams.

In testimony whereof, I affix my signature, in presence of two witnesses.

LOUIS DEWALD.

Witnesses:
JNO. H. CLEMENTS,
R. G. KUNKEL.